United States Patent [19]

Heyser

[11] Patent Number: 4,891,033
[45] Date of Patent: Jan. 2, 1990

[54] DEVICE FOR COUPLING COIL SPRINGS COMPRESSED IN SERIES IN A CLUTCH DAMPER

[75] Inventor: William M. Heyser, Northbrook, Ill.

[73] Assignee: Automatic Spring Coiling Co., Chicago, Ill.

[21] Appl. No.: 183,924

[22] Filed: Apr. 20, 1988

[51] Int. Cl.$^4$ ............................................... F16D 3/12
[52] U.S. Cl. .................................. 464/68; 192/106.2; 464/66
[58] Field of Search ................. 192/106.2; 464/64, 66, 464/68

[56] References Cited

U.S. PATENT DOCUMENTS

| | | | |
|---|---|---|---|
| 1,510,943 | 10/1924 | Kjelsberg | 464/66 |
| 2,436,248 | 2/1948 | Cardillo | 464/66 |
| 2,437,537 | 3/1948 | Kelleher | 464/68 |
| 4,304,107 | 12/1981 | Fall. | |
| 4,341,475 | 7/1982 | Saladin | 464/66 X |
| 4,591,348 | 5/1986 | Takeuchi et al. | 464/66 X |

FOREIGN PATENT DOCUMENTS 1625823  1/1970  Fed. Rep. of Germany ........ 464/66

Primary Examiner—Daniel P. Stodola
Attorney, Agent, or Firm—Wallenstein, Wagner & Hattis, Ltd.

[57] ABSTRACT

A helical coil spring coupler for clutch dampers used in torque converters or clutches wherein the coil springs are compressed in series alignment end-to-end in an arcuate channel. Each coil spring-to-coil spring interface has a ball and socket coupling attached to the springs and providing force transmission axially through each coil. The spring end coils are fully supported by a flange of the couplings; preventing spring end coil breakage.

4 Claims, 2 Drawing Sheets

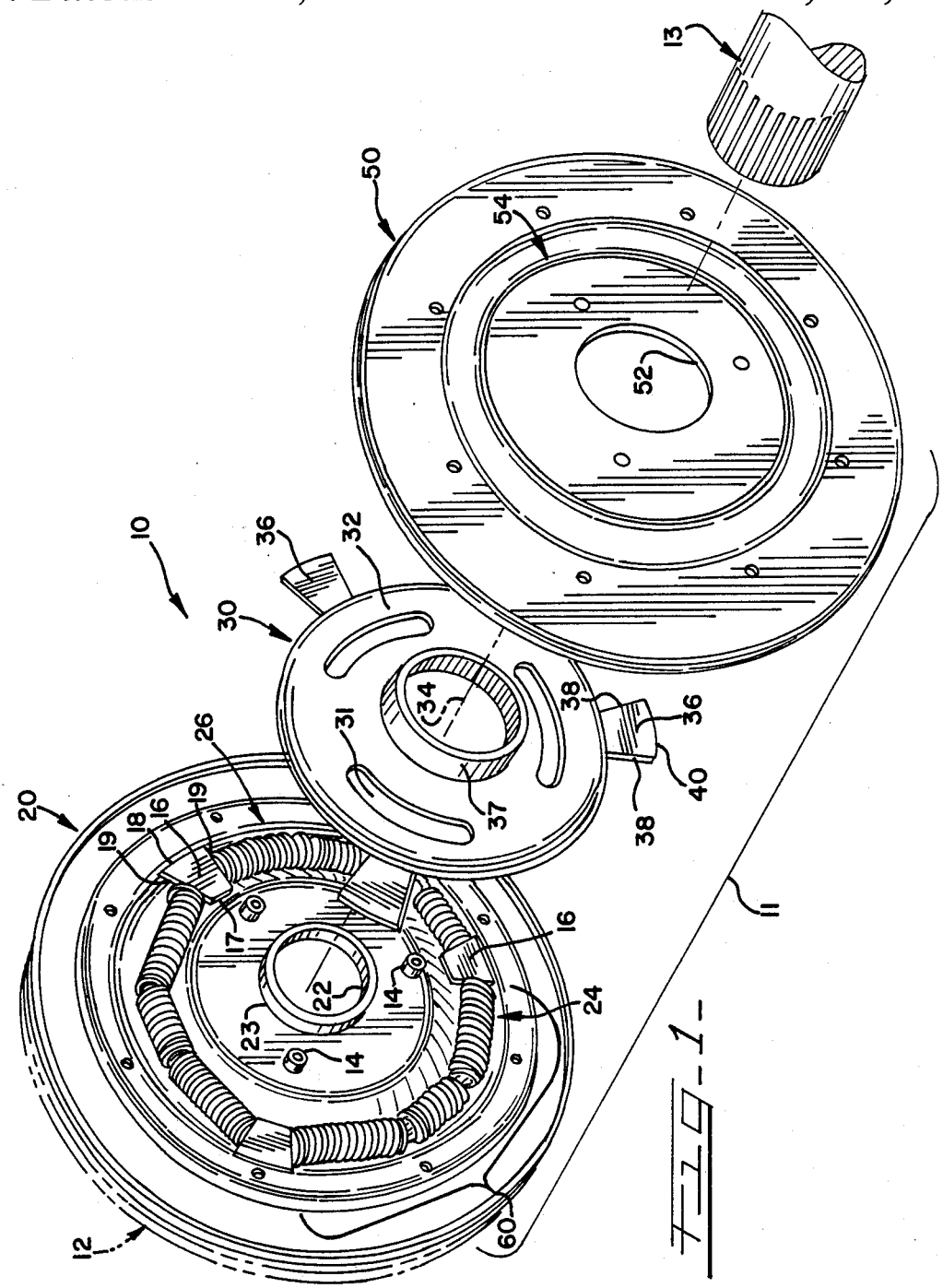

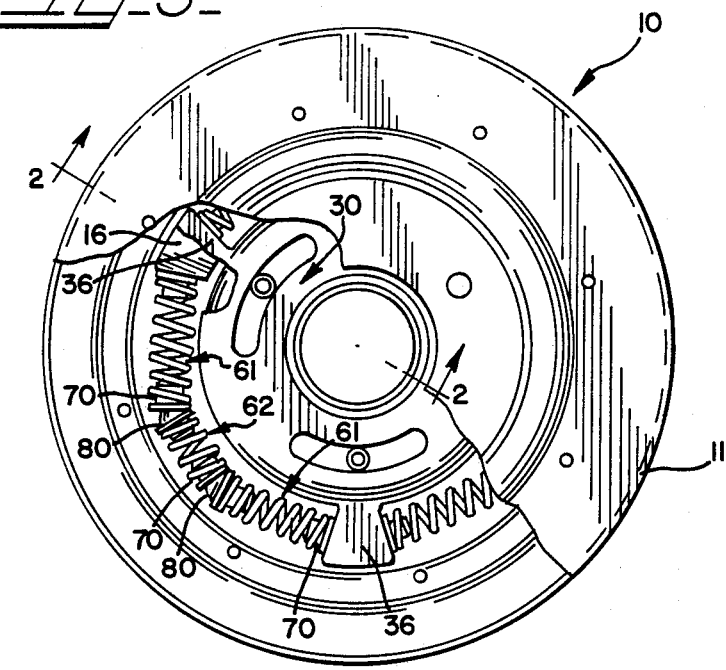
FIG-3-
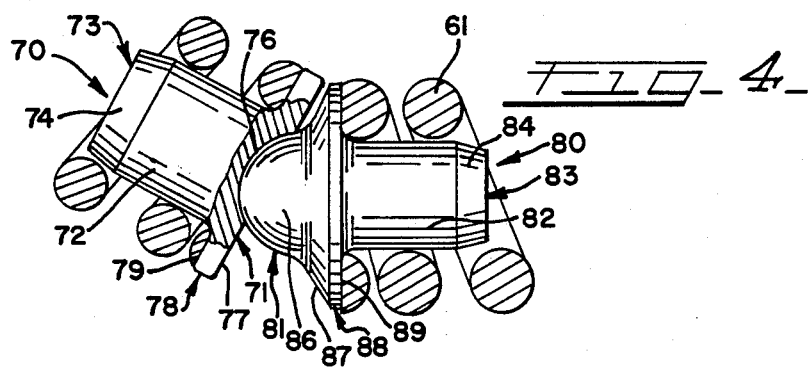
FIG-4-
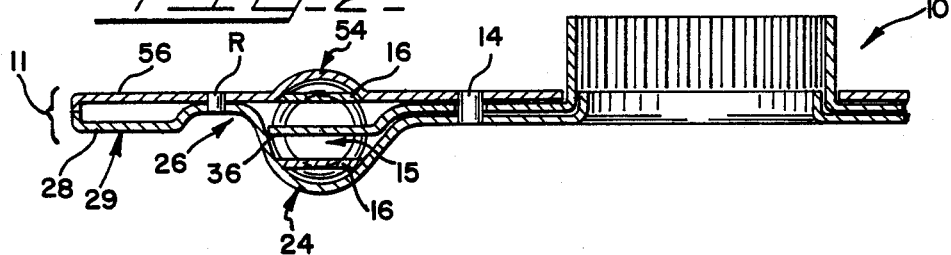
FIG-2-

DEVICE FOR COUPLING COIL SPRINGS COMPRESSED IN SERIES IN A CLUTCH DAMPER

DESCRIPTION

1. Technical Field

The present invention relates generally to clutch dampers used in torque converters and clutches, and particularly to spring couplers used therein.

2. Background of the Invention

There are many types and configurations of clutch damper devices used in automotive torque converters and clutches. In one common clutch damper configuration, damping is achieved by compressing groups of coil spring members. The spring members in each group merely rest end-to-end within a circular channel within the clutch damper housing and have a divider device separating adjacent springs. Each coil spring member is a straight helical coil with the last coil of each spring being closed and ground flat to present a blunt coil end. However, when the straight coil spring members are aligned within a circular channel, each spring makes only point contact with the divider between springs in its compression group.

This configuration of clutch damper is favored over more complex designs because of its simplicity of manufacture and because the device configuration maximizes effective spring length and thus damping strength. In this configuration however, problems arise when the force transmitted through the damping device is large enough to compress the springs to a closed position. The springs in this position are virtually solid and the impact of the residual force concentrates on the partial bearing surface of the ground end coils of the springs.

Frequently, the force is sufficient under these circumstances to break off the end portion of a spring at the point of contact. This is especially true when the spring has rotated to bring the point of contact upon a portion of finished coil end which is thinner than the coil at large.

A small piece once broken off can circulate throughout the torque converter or transmission and cause damage to other systems.

In an attempt to solve this problem within a clutch damper of this design, others have incorporated various methods to limit the travel of the damper to prevent the damping spring from being compressed to a solid position. For example, one method utilizes a positive stop built into either the drive or driven member of the damper assembly. Another example of this approach is to insert, into each damping spring, either a coil spring that goes solid before the damping spring or a dowel serving the same purpose.

All of these methods that limit damper travel, significantly reduce the dynamic range of the damping device and thus jarring impacts result at lower torque forces.

A better approach to this problem has been to direct compression force axially through a spring and to distribute impact force over the whole circumference of a spring coil end when the spring goes solid. A common structure utilizing this approach involves placing a steel ball in the circular channel, thus separating each spring member of a group.

With that method, a ball has to be large enough in diameter to seat within the circular coil spring end without being forced into the spring core. The necessary spring diameter for most dampers dictates a ball diameter that is so large that it significantly increases linkage space between springs and thus sacrifices coil spring length. The shortened spring lengths reduce damping strength. Additionally, when excess force compresses the springs to a solid position, the spherical surface of the ball imposes a spreading radial force vector within the end coil of a spring which frequently results in spring tip breakage.

A similar approach involves placing a round wedge, with converging arcuate wedge faces, in the circular channel separating each spring member in a group. Even ideally, the resulting structure reduces linkage space very little over the steel ball structure. In addition, the round wedge can freely rotate during clutch damper modulation. Thus, at any given point in time, the broader part of the wedge may be rotated toward the inner circumference of the channel, further increasing linkage space.

Another limitation of the wedge shape spring separators exists. The wedge face of the separator is arcuate and an abutting coil spring end is substantially flat. Therefore, the separator makes only two narrow points of contact on a spring coil end. Impact forces are thus focused and greatly concentrated on these two narrow points. With force distribution limited to these two narrow points, spring tip breakage continues to be a problem.

The present invention relates to the provision of an improved mechanism to prevent point contact between the springs in a compression group within a clutch damper of this type. This is achieved by means attached to the springs which dynamically couples and positively aligns the springs directing compression forces through the center axis of each spring. The positive coupling also achieves a more uniform spring group dynamic and thus a stronger, more uniform damping. Additionally the coupling means provides a full bearing surface which disburses impact forces over the entire circumference of a spring coil end.

It is further the object of the present invention to provide a mechanism which achieves the above advantages with minimal linkage space between springs in a compression group. The small linkage space achieves the further advantage of allowing the use of longer coil spring members within a compression group. Having longer spring member lengths further increases damping strength.

SUMMARY OF THE INVENTION

To achieve the foregoing objects, in a clutch damper of the type where straight coil spring members merely rest end-to-end with a divider in a circular channel, the present invention generally comprehends the provision of a means to pivotally couple coil spring members wherein the means is attached only to spring members and not to the clutch damper housings or super structures.

In a preferred embodiment of the present invention, each coil spring-to-coil spring interface is cooperatively coupled by a pair of spring couplers operatively mating as a ball and socket.

One spring coupler comprising a cylinder having a domed end defining a ball and the other coupler comprising a cylinder having a spherical depression in one end defining a socket. The cylinders are radially dimensioned to present an interference fit with the inner radius of a coil spring.

Each spring coupler includes a flange which abuts the end coil of a spring member upon insertion of the spring coupler into a coil spring; leaving the ball and socket of each coupler outwardly exposed. The flange is adapted to provide a positive stop for the cylindrical insert and to distribute any impact force over the entire circumference of a coil spring end.

Thus, during clutch damper operation, each spring within a compression group is operatively and concentrically coupled by a ball and socket. The ball and socket coupling is immune from asymmetric alignment and rotational irregularities and thus uniformly directs compression forces in an axial vector through all the springs in a group. Furthermore, when a large force causes the coil spring members to be compressed completely solid, the resulting impact force is distributed through the flange over the entire circumference of the spring coil end.

Because the spring couplers of the present invention are attached within coil spring ends, the ball and socket radii need bear no relation to the spring coil radii as opposed to the conventional steel ball spring separators. The ball and socket as cooperative fixtures of the attached coupling inserts need only be radially dimensioned sufficient to make ball and socket contact in regard to spring length within arcuate alignment. Thus, linkage space is greatly reduced and is equal only to the sum of the thicknesses of any two flanges.

Other advantages and aspects of the invention will become apparent upon making reference to the specification, claims, and drawings to follow.

BRIEF DESCRIPTION OF THE DRAWINGS

FIG. 1 is an exploded perspective view of a common clutch damper including a preferred embodiment of the spring couplers of the present invention;

FIG. 2 is a cross sectional view of one half of the clutch damper taken along line 2—2 of FIG. 3;

FIG. 3 is a partial cut away front elevation view of the clutch damper;

FIG. 4 is a side perspective view of a preferred embodiment of the ball and socket spring coupler of the present invention.

DETAILED DESCRIPTION OF THE INVENTION

Referring now to the disclosure in the drawings wherein are shown illustrative embodiments of the present invention, FIG. 1 depicts an example of a commonly favored configuration of a clutch damper 10, used for connection to a torque input means such as clutch plate 12 and to a torque output means such as shaft 13.

Clutch damper 10 generally includes a hub 30 in the form of an annular ring or plate 32 having a central opening 34 and three circumferentially equally spaced hub arms 36 extending radially from the periphery of plate 32. Opening 34 has a peripheral lip 37 extending normal from plate 32 and has internal splines or teeth to engage torque output means 13. Hub arms 36 are flat and have a pair of sides 38, 38 outwardly diverging from plate 32 at an angle to reflect a radius of plate 32 and terminating in an arcuate end 40.

Hub 30 is located within damper housing 11 and is independently rotatable therein. In this exemplary embodiment, hub 30 is rotatably indexed on three circumferentially equally spaced locating pins 14 of housing 11. The pins 14 are received in three corresponding elongated arcuate slots 31 in hub plate 32.

Damper housing 11 is generally formed by a front retainer plate 20 and a rear retainer plate 50 being joined by means such as rivets R, as best depicted in FIG. 2.

Front retainer plate 20 is in the form of an annular plate having a central opening 22 and a circumferential depression 24. As better disclosed in FIG. 2, depression 24 includes an arcuate peripheral shoulder 26 having a peripheral flange 28 being generally in the plane of plate 20 and adapted to engage frictional rotary means such as clutch plate 12 on its outer surface 29. Opening 22 includes a peripheral lip 23 extending inwardly normal from plate 20 and defining journal.

FIG. 1 further discloses rear retainer plate 50 in the form of an annular plate having a central opening 52 to allow entrance of shaft 13. FIG. 2 best discloses rear retainer plate 50 as including a circumferential depression 54 having a peripheral flange 56.

As disclosed in FIG. 2, when retainer plates 20 and 50 are joined, plate depressions 24 and 54 complete a circular channel 15 in damper housing 11 having its inner circumference open to allow passage and rotational movement of hub arms 36 which extend into the channel.

FIGS. 1, 2 and 3 disclose that located within channel 15 are three pairs of drive stakes 16 being equally spaced and axially aligned with hub arms 36. Each drive stake is generally a flat plate having two parallel sides 17, 18 and two converging sides 19, 19 being parallel with and reflecting a radius of channel 15.

As best disclosed in FIGS. 2 and 3, each pair of drive stakes 16 are axially aligned and include one drive stake attached in the central radius of each depression 24 and 54.

FIGS. 1, 2 and 3 disclose that three groups of three coil spring members generally referenced by 60, are positioned one group each between adjacent and aligned hub arms 36 and drive stakes 16. As best disclosed in FIGS. 2 and 3, the coil spring members within a group are aligned end-to-end with the end coil spring members of each group abutting a hub arm 36 and a pair of drive stakes 16. Each pair of drive stakes is adapted to engage sides 19, 19 flushly to a coil spring member 61 along a top and bottom chord of the spring end circumference. The outwardly diverging sides 38, 38, of each hub arm 36, are adapted to flushly abut a coil spring member end circumference along its diameter.

When clutch damper housing 11 is engaged to the torque input means 12, the coil spring members are driven in series, as individual groups, from one end by a pair of drive stakes 16 in the rotational direction of housing 11. Hub arms 36, being attached to the lagging torque output means 13, applies an inertial lag force to the opposite end of the group of spring members in a counter rotational direction. Thus, the spring members are compressed in series by the opposed forces until the lagging member equalizes in rotational speed and torque.

FIG. 3 best discloses that each spring member within each group 60 is in the form of a helical coil having a straight linear axis and coil ends which are closed and ground to a flat end plane. In a preferred embodiment of the present invention, as best disclosed in FIG. 3, the end members 61 of a given spring group 60 have a selected length to provide maximum single spring length within an arcuate alignment. The intermediate coil spring 62 has a somewhat shorter axial length.

According to the primary aspect of the present invention, the adjoining ends of coil springs 61,62 are provided with coupling means accommodating universal pivotal movement of the spring ends with respect to each other. More specifically, the preferred coupling means is in the form of a ball and socket connection.

Each outer spring member 61 has a socket spring coupler 70 inserted into each of its ends. The center coil spring member 62 has a ball spring coupler 80 inserted into each of its ends. Thus, drive stakes 16 and hub arms 36 engage each end coil spring member 61 upon a socket spring coupler 70. Each coil spring-to-coil spring interface is provided with a ball to socket spring coupler.

FIG. 4 discloses socket spring coupler 70 in the form of a solid cylinder 72 having opposed ends 71, 73. End 73 including a circumferential taper 74 and end 71 having a spherical depression 76 concentrically located in the cylinder end plane. Socket spring coupler 70 also includes a flange 78 extending radially normal from a circumference of cylinder 72. Flange 78 having parallel sides 77, 79 and being located so that side 77 is in the plane of the end radius of cylinder end 71.

Socket spring coupler 70 is positioned within the ends of coil spring members 61 with side 79 of flange 78 abutting the end coil of the spring. Cylinder 72 is dimensioned to present an interference fit with the inner radius of a coil 61 with taper 74 being adapted to locate and wedgeably open a spring 61 coil end to permit cylinder insert during manufacture. Flange 78 has an outer radius that is equal to coil spring member 61 outer coil radius.

FIG. 4 discloses ball spring coupler 80 in the form of a solid cylinder 82 having opposed ends 81, 83. End 83 has a taper 84 and end 81 is concentrically domed and defines one half a spherical ball 86. Socket spring coupler 80 also includes a flange 88 extending radially normal from a circumference of cylinder 82. Flange 88 has sides 87, 89 and is located at cylinder end 81. Flange side 89 being perpendicular to the axial plane of cylinder 82 and side 87 is tapered to a diameter of the ball 86 and at an angle that reflects a radius of channel 15.

Ball spring coupler 80 is positioned within the ends of a coil spring 62 with side 89 of flange 88 abutting the end coil of the spring. Cylinder 82 has an outer radius dimensioned to present an interference fit with the inner radius of coil spring member 62. Taper 84 is adapted to locate and wedgeably open a spring 62 coil end to permit cylinder insert during manufacture. An outer radius of flange 88 is equal to a coil spring member 62 outer coil radius.

FIG. 3 and 4 disclose that, the radius of ball 86 and socket 76 or male and female members are equally dimensioned and fit into each other presenting a concentric radial contact surface for each spring through which force is transmitted from spring to spring.

Flange 88 has tapered side 87 which is parallel to a radius of channel 15 so as to compliment the angle necessarily presented by the right angled coil spring member ends as aligned in channel 15. Tapered flange side 87 thus produces an extended contact surface to flushly abut a flange side 77 of an adjacent spring in the event coil spring members are compressed to a solid position during clutch damper operation. Under those circumstances flanges 78 and 88 additionally provide bulkhead protection for coil spring member end coils.

Because the spring couplers 70 and 80 of the present invention are attached within coil spring ends of springs 60, the ball 86 and socket 76 radii need bear no relation to the spring coil radii as opposed to the conventional steel ball spring separators. The ball and socket as cooperative fixtures being attached to the springs to be coupled, need only a radial dimension sufficient to make ball and socket contact in regard to spring length within arcuate alignment in channel 15.

Thus, linkage space is greatly reduced and is equal only to the sum of the thicknesses of any two flanges when seated.

Although the foregoing description details a clutch damper 10 having three springs per group, this present invention provides for spring coupling in embodiments having two or more springs. Thus providing a socket coupler 70 and ball coupler 80 inserted in the adjoining ends of any two adjacent springs.

In other embodiments, socket spring coupler 70 may be omitted from coil spring 61 ends which abut the drive stakes 16 and hub arms 36. Still, other embodiments may allow the improved spring coupling achieved by the present invention by presenting only a ball spring coupler 80 at each coil spring-to-coil spring interface wherein coupler 80 is inserted in one coil spring end and the exposed ball rests within the adjoining end coil of the adjacent coil spring.

In other embodiments, the angle of taper on flange side 87 of flange 88 may be cooperatively adjusted with a taper which may be provided on flange side 77 of flange 78.

In the preferred embodiment, the spring couplers 70 and 80 are made of machinable steel, however, in other applicable embodiments, other materials may be used such as aluminum or plastic. Similarly, solid cylinders 72 and 82 may be other than solid such as a tubular cylinder or other than a cylinder shape such as octagonal.

In other embodiments, the socket 76 and ball 86 may be other than concentric with cylinders 72 and 82 such as offset closer to the inner radius of channel 15. Similarly, socket 76 and ball 86 may be other than spherical in shape such as hyperbolic.

The present invention provides for coupling of coil springs arranged end-to-end in other than arcuate alignment such as straight axial alignment.

The present invention provides coupling of springs arranged end-to-end in other than clutch dampers such as any device wherein at least two springs are arranged end-to-end and are operably interposed between a drive and a driven member.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. In a clutch damper having at least two coil spring members arranged end-to-end within an arcuate channel and operably interposed between a drive and a driven member, wherein the improvement comprises:

a first means for coupling an adjacent coil spring member, said first means being radially dimensioned to present an interference fit with an inner radius of one end of a coil spring member and presenting a ball, said ball extending outwardly from the end of the spring member; and, a second means for coupling an adjacent coil spring member, said second means being radially dimensioned to present an interference fit with an inner radius of an adjacent spring member on the end adjoining to said first means and presenting a socket, said socket facing outwardly from the spring end toward said first means;

whereby, said first means and said second means being attached to adjoining ends of at least two adjacent coil spring members cooperatively engage one another to pivotally couple the adjoining coil spring members.

2. In a clutch damper having at least two coil spring members arranged end-to-end within an arcuate channel and operably interposed between a drive and a driven member, wherein the improvement comprises:

a first cylinder having opposed ends with at least one end being concentrically domed;

said first cylinder including a flange extending radially from a circumference of said first cylinder and located proximate to said domed end;

a second cylinder having opposed ends with at least one end which includes a concentric spherical depression in the cylinder end surface;

said second cylinder including a flange extending radially from a circumference of said second cylinder with said flange being proximate to said spherical depression;

said first and second cylinders being radially dimensioned to present an interference fit with the inner radius of a coil spring member;

said first cylinder being inserted into at least one end of a coil spring member with said flange of said cylinder abutting the end coil of the spring and with said domed end being outwardly exposed;

said second cylinder being inserted into an adjoining end of an adjacent second coil spring member with said flange abutting the end coil of the spring and with said spherically depressed end being outwardly exposed;

said domed end of said first cylinder and said spherical depression of said second cylinder being dimensioned to engage one another as a ball and socket;

whereby, at each coil spring member-to-coil spring member interface, within a particular clutch damper, an inserted pair of said first and second cylinders present a ball and socket couple between the coil spring members.

3. In a clutch damper with ball and socket spring couplers as set forth in claim 2, wherein at east said flange of said first cylinder includes a flange side adapted to flushly abut the end coil of a coil spring member and an opposed tapered flange side;

said tapered flange side having selected angular dimension to reflect a radius of the arcuate channel of the clutch damper, so that said tapered flange side produces a flushly abutting extended contact surface with said flange of said second cylinder during spring member compression.

4. The improved clutch damper with ball and socket spring couplers as set forth in claim 2 wherein said first cylinder being circumferentially tapered on said end opposite said domed end; and, said second cylinder being circumferentially tapered on said end opposite said spherically depressed end;

said circumferentially tapered first and second cylinder ends being adapted to guide said first and second cylinders during insertion into a coil spring member.

* * * * *